UNITED STATES PATENT OFFICE.

CHARLES J. VAN DEPOELE, OF CHICAGO, ILLINOIS.

SECONDARY ELECTRIC BATTERY.

SPECIFICATION forming part of Letters Patent No. 282,414, dated July 31, 1883.

Application filed February 8, 1883. (No specimens.)

*To all whom it may concern:*

Be it known that I, CHAS. J. VAN DEPOELE, of Chicago, in the county of Cook and State of Illinois, have invented new and useful Improvements in Secondary Electric Batteries; and I do hereby declare that the following is a full, clear, and exact description thereof.

My invention relates to an improved process of forming or polarizing the plates or elements of secondary or storage batteries; and it consists in the admixture, with the ordinary electrolyte of a secondary battery, or any other source of electricity in which the process of oxidation is desirable, of the salts of manganese in suitable quantities and in the manner hereinafter described.

The leaden elements to be charged or polarized are first placed in a bath of about eight parts water, one part nitric and one part sulphuric acids. This immersion will remove the dirt and grease, which being effected, the elements are removed to a bath containing about seven parts water, two parts nitric acid, and one part sulphuric. Connection is then made with a suitable source of electricity, and a light or rather weak current is allowed to flow through the elements for about an hour. The charging is then reversed and continued for about four hours or less, according to the strength of the current employed, when the plates will be found one covered with crystals of lead and the other heavily coated with nitrate of lead. The elements are now withdrawn from the nitric-acid solution and placed in slowly-running water until the free nitric acid is removed, after which the elements are placed in an ordinary electrolyte, sulphuric acid, and water. Connection is again made with the source of electricity in such direction that the nitrate of lead previously deposited may be carried over to the opposite plate, said elements being subject to the charging-current until that result is effected, when it will be found that the nitrate of lead has been re-deposited in the form of peroxide of lead. The battery is now allowed to again discharge itself, after which it is desirable to add to the electrolyte a quantity of the salts of manganese, preferably the black oxide thereof, and the admixture may be accomplished in any convenient manner, as by withdrawing the elements and sprinkling the oxide thereon, or by mixing the requisite quantity thereof in water and pouring it into the electrolyte, or by placing it in a receptacle in the cell especially provided therefor. The black oxide of manganese being added to the electrolyte in which the lead plates are placed, as soon as the current is turned on permanganic acid is formed at the positive plate, and manganese is deposited on the negative plate in the form of a dark-brown precipitate, which combines with the peroxide of lead on the same plate. The addition of the peroxide of manganese in my experience considerably increases the electro-motive force of the cell, and a shorter time is sufficient to recharge the battery. The presence of the permanganic acid in the electrolyte is shown by its changing to a purple color as soon as the charging has begun, and the said purple color will gradually disappear, indicating that the permanganic acid has changed into peroxide of manganese by uniting with the oxygen set free by the decomposition of the electrolyte. Said peroxide of manganese combines with the peroxide of lead previously formed, and together they are deposited on the positive electrode. The salts of manganese possess great affinity for oxygen, and the addition of the black oxide of manganese to the electrolyte during the formation or charging of a battery increases the efficiency and strength thereof by increasing the formation of electro-chemical potential, which renders the battery more powerful, and largely prolongs its action.

The above-described method of energizing the plates by the use of a nitric-acid solution is not claimed herein, as it forms the subject-matter of a separate application. This application is a division of the application on which Patent No. 276,099 was granted, in which the use of manganese is described, but not claimed.

Having described my invention, I claim—

In the art of energizing secondary batteries, the herein-described process, which consists in first coating the respective elements with peroxide and monoxide of lead, and in afterward combining with said coatings the black oxide of manganese precipitated thereon by electrolytic action, substantially as set forth.

CHAS. J. VAN DEPOELE.

Witnesses:
H. S. SPRAGUE,
E. W. ANDREWS.